(12) United States Patent
Petta

(10) Patent No.: US 8,504,426 B2
(45) Date of Patent: Aug. 6, 2013

(54) SYSTEMS AND METHODS TO CONNECT PEOPLE VIA VIDEOS FOR REAL TIME COMMUNICATIONS

(75) Inventor: Damon Layton Petta, Upland, CA (US)

(73) Assignee: Ingenio LLC, San Francisco, CA (US)

( * ) Notice: Subject to any disclaimer, the term of this patent is extended or adjusted under 35 U.S.C. 154(b) by 1078 days.

(21) Appl. No.: 12/117,697

(22) Filed: May 8, 2008

(65) Prior Publication Data

US 2009/0282433 A1     Nov. 12, 2009

(51) Int. Cl.
*G06Q 30/00* (2012.01)

(52) U.S. Cl.
USPC ...................................... 705/14.73

(58) Field of Classification Search
USPC ...................................... 705/14.73
See application file for complete search history.

(56) References Cited

U.S. PATENT DOCUMENTS

| | | | | |
|---|---|---|---|---|
| 7,287,009 | B1* | 10/2007 | Liebermann | 705/42 |
| 8,218,741 | B2* | 7/2012 | Goel | 379/114.13 |
| 2004/0152442 | A1* | 8/2004 | Taisto et al. | 455/406 |
| 2006/0287920 | A1* | 12/2006 | Perkins et al. | 705/14 |
| 2007/0100956 | A1* | 5/2007 | Kumar | 709/217 |
| 2007/0124207 | A1* | 5/2007 | Faber et al. | 705/14 |
| 2007/0198921 | A1* | 8/2007 | Collison et al. | 715/517 |
| 2008/0021775 | A1* | 1/2008 | Lerman et al. | 705/14 |
| 2009/0030774 | A1* | 1/2009 | Rothschild et al. | 705/10 |
| 2009/0157511 | A1* | 6/2009 | Spinnell et al. | 705/14 |
| 2009/0192889 | A1* | 7/2009 | Lukes et al. | 705/14 |

OTHER PUBLICATIONS

YouTube, LLC, "Primary Question: Global Warming," webpage available at http://www.youtube.com/watch?v=p9pHy_UZ5g0&feature=dir, accessed Feb. 6, 2008.

* cited by examiner

*Primary Examiner* — James W Myhre
(74) *Attorney, Agent, or Firm* — Kilpatrick Townsend & Stockton LLP

(57) ABSTRACT

Systems and methods to connect people for real time communications via distribution of video clips are described.

20 Claims, 7 Drawing Sheets

SYSTEMS AND METHODS TO CONNECT PEOPLE VIA VIDEOS FOR REAL TIME COMMUNICATIONS

FIELD OF THE TECHNOLOGY

At least some embodiments disclosed herein relate to distribution of information, such as video, and real time communications, such as connecting people for telephonic conversation, chat in text, voice and/or video, etc.

BACKGROUND

Streaming is a technique to transmit a media file over a data communication network, such as the Internet, using a stream of data such that a received portion of the file can be used by the receiving computer to present the media content while the remaining portion of the file is still being transmitted. Since the media data can be transmitted to the receiving computer while the received portion is being played back to the user, the user does not have to wait until the entire media file is downloaded.

Time-based media content, such as video and/or audio clips can be transmitted via streaming techniques to reduce the time the user has to wait to enjoy the content.

For example, links to video clips can be embedded in a web page such that when the web page is displayed in a browser, the video clips can be streamed and played within the web page.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information.

While the Internet provides various ways for people to communicate with each other, such as email, chat in text, voice and/or video, telephone systems are also widely used in conducting real time communications between persons. Telephone numbers are typically provided in advertisements, web sites, directories, etc., as a type of contact information to reach businesses, experts, persons, etc.

To establish a telephone connection, a telephone system may also use a circuit switched network and/or a packet switched network. Traditional land-line based telephone systems connect one telephone set to another through one or more switching centers, operated by one or more telephone companies, over a land-line based telephone network. Voice over Internet Protocol (VoIP) techniques allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Wireless telephone systems allow not only voice communications but also data communications. For example, cellular phones can be used to receive and send short messages through a Short Message Service (SMS). Web pages can be retrieved through wireless cellular links and displayed on cellular phones. Wireless Application Protocol (WAP) has been developed to overcome the constraints of relatively slow and intermittent nature of wireless links to access information similar or identical to World Wide Web.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
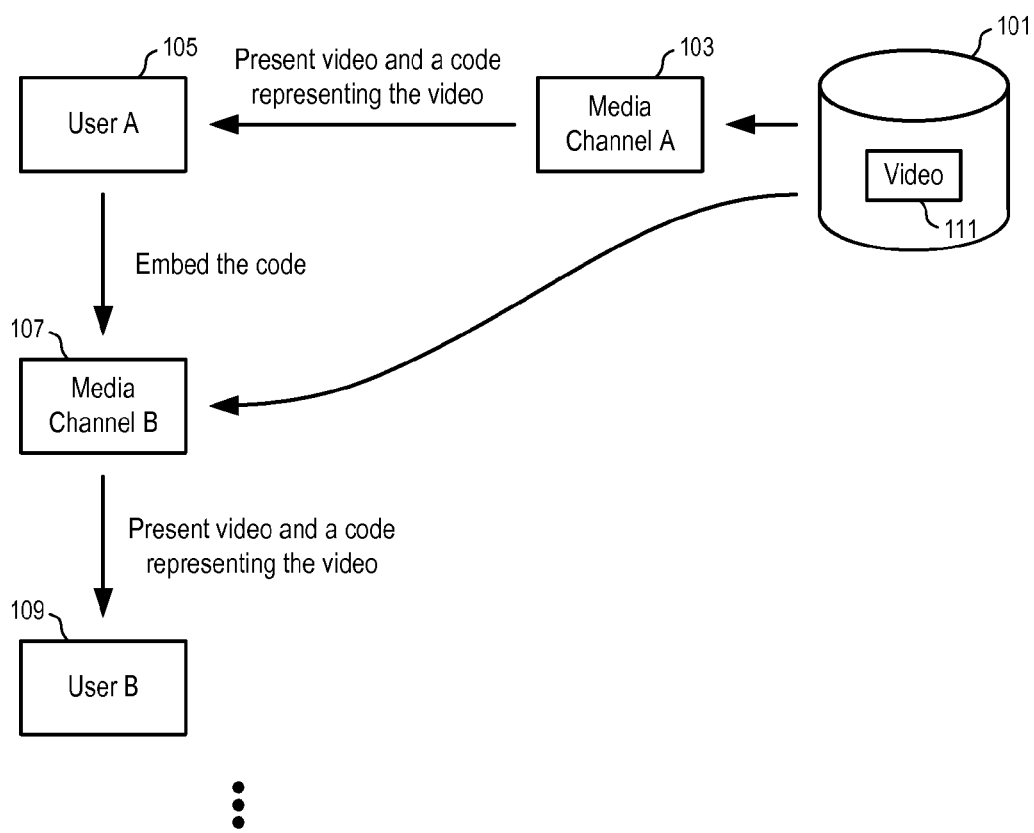
FIG. 1 shows a system to distribute video advertisements according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a web page presents a video advertisement prepared for a listing (e.g., prepared by an advertisement agency for an Internet Yellow Page listing) using an embedded video player. To show the video advertisement, the web page can provide the video player using a built-in part of a web browser, or a plug-in module of the web browser, or a script running in the web browser, or a combination of built-in components of the web browser, one or more generic plug-in modules for the web browser, and a set of instructions for scripting in the web browser. The web browser activates the video player when loading the web page; and a server streams the video advertisement to the video player for presentation.

Although video advertisements are discussed and illustrated as examples, the disclosure is not limited to video advertisement. Other types of video information can also be distributed in a similar way.

In one embodiment, if the user of the web browser is interested in distributing the video (e.g., via blog or email), the user can select a user interface (e.g., an icon button) on the video player to request a code, which can be copied and pasted by the user into a web based document (e.g., blog or email or other types of online publications) for distribution to other users. In one embodiment, the web server, the web browser, the web page and/or the video player dynamically generates the code in response to the user request.

In one embodiment, when the code embedded by the user is rendered in a web browser, the web browser activates a similar video player to present the video, with the user interface (e.g., an icon button) which can be used by the current user to request a code for distribution of the video.

In one embodiment, to track user responses, the video advertisement includes a telephone number of a connection server. A connection server assigns the telephone number to the advertisement. Thus, when the connection server receives a telephone call from a user, the connection server further connects the call to the advertiser. For example, the connection server can forward the call via a telecommunication carrier (e.g., via a call forwarding service), or place a separate call and bridge the incoming call received from the user and the outgoing call placed to the advertiser to connect the user and the advertiser.

Through the use of the telephone number of the connection server, user responses to the video advertisement can be tracked by the connection server. In one embodiment, the connection provider charges the advertiser an advertisement fee for each distinct customer or each distinct call connected to the advertiser via the video advertisement. Alternatively, or in combination, the advertisement agency, the web server operator and/or the connection provider can charge the advertiser a fee for the production of the video advertisement, a fee for each viewing of the video advertisement by a customer, and/or a fee for each selection of the video advertisement, etc. In one embodiment, the advertisement agency, the web server operator and the connection provider are a single business entity.

In one embodiment, the video player presents the telephone number of the connection server in the video (e.g., in the last frame of the video advertisement). The connection provider may dynamically assign the phone number to the connection server at the time of playback. The connection provider may recycle the assigned phone number for assignment to other advertisements if the assigned phone number is not called by a user for a period of time.

For example, in response to the video stream server being ready to stream the last frame of the video advertisement to the video player, the connection server can select one of a plurality of telephone numbers of the connection server and assign it to the video advertisement.

In one embodiment, the video stream server, or another server connected to the video stream server, dynamically generates the last frame of the video advertisement after the telephone number of the connection server is assigned to the video advertisement, at a time near the end of streaming the video advertisement to the video player.

In another embodiment, the video stream server or the web server transmits the assigned telephone number in text to the video player, which overlays the telephone number on the last frame of the video advertisement, or dynamically generates the last frame of the video from text information (and/or other graphical information).

In one embodiment, the video player is to display a banner advertisement at the end of the video. The web browser or the video player may present the banner advertisement as a web page embedded inside the space reserved for the video player.

In one embodiment, the web browser or the video player presents a VoIP based telephonic reference at the end of the video (or in the last frame of the video) to track user responses. The video player allows the user to interact with the VoIP based telephonic reference. For example, a user can select the VoIP based telephonic reference to initiate a chat in text, voice and/or video, using a module integrated with the video player, or using a separate module, or using a helper application which runs substantially independently from the web browser.

In one embodiment, at the end of the video, the web browser or the video player loads a banner into the place of the video player, where the banner may include a telephonic reference to initiate a call to the advertiser, or a link to a web site of the advertiser, etc. For example, the banner may display a telephone number of the connection server with or without an extension to reach the advertiser. For example, the banner may present a link which is selectable by a user to request a callback from a connection server to the user for a connection to the advertiser. For example, the banner may present a link which is selectable by a user to generate a message to an advertiser for a callback to the user. For example, the banner may present a link or icon button which is selectable by a user to start a VoIP application or module to initiate a telephonic connection to the advertiser.

In one embodiment, the banner may further include a link/ button to restart the video without reloading the web page.

In one embodiment, when loaded by the web browser the embedded code causes the web browser to request a server to analyze the content of the web page in which the coded is embedded, to dynamically determine a relevant advertisement for the customer (e.g., further based on the preferences of the customer, viewing history of the customer, etc.). In one embodiment, the server dynamically analyzes the content of the web page to select an advertisement for the banner presented in the last frame of the video or at the end of the video. The web browser or the video player can also present the banner at the beginning of the video, before the presentation of the video, or during the video presentation.

In one embodiment, the connection server, advertisement agency, and/or the web server rewards the distributor of the code (e.g., a blogger who embeds the code in the blog) for customer interaction with the video (e.g., interaction with the video at the blog on a per call basis for customer calls generated from the video presentation on the blog, on a per click basis for web traffics generated from the video presentation on the blog, etc.).

FIG. 1 shows a system to distribute video advertisements according to one embodiment. In FIG. 1, a media channel (103) presents the video (111) stored at a centralized location (101) to a user (105). For example, the media channel (103) can be an Internet Yellow Page site which lists the phone numbers of businesses and provides advertisements for the businesses. A designer of the web page embeds the video (111) in the web page (e.g., resulted from a search of a business or from browsing a directory of business entities). A user can select the video player to request a code representing the video, which can be embedded into a web document for distribution by a separate entity via another media channel (107), such as a blog.

In FIG. 1, after the user (105) requests the code via the media channel (103) and embeds the code in the web document of the media channel (107), users of the media channel (107) can view the video and request the code in a way similar to the distribution of the video and code via media channel (103). For example, the user (109) of the media channel (107) can view the video and request the code when interested in distributing the video via a further media channel (e.g., another web site).

Although FIG. 1 illustrates an example where a centralized location stores the video (111), a peer to peer network can alternatively store and distribute the video (111).

Figure 2:
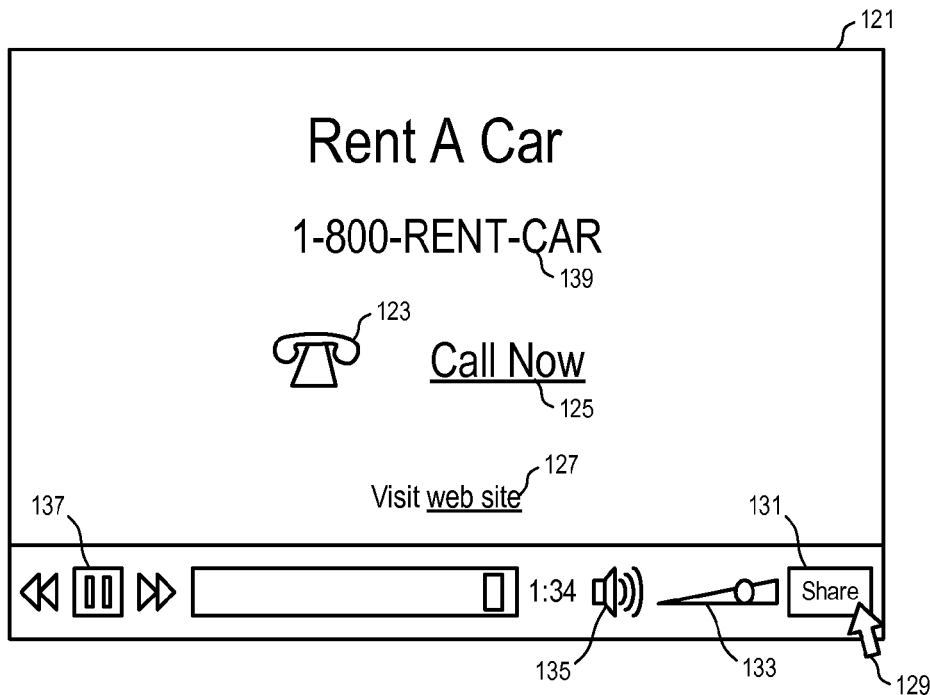
FIGS. 2 and 3 illustrate a video player configured to provide a code to redistribute a video according to one embodiment.
Figure 3:
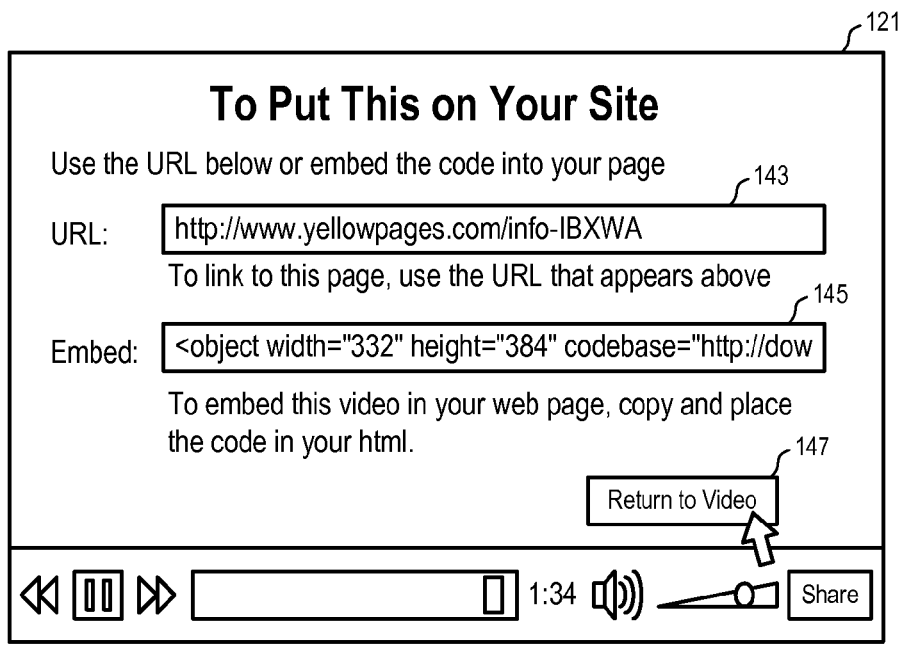

FIGS. 2 and 3 illustrate a video player configured to provide a code to redistribute a video according to one embodiment. In FIG. 2, the video player (121) includes a set of user interface elements to control the presentation of the video. For example, a user can use an icon button (137) to pause or stop the video; a user can use an icon button (135) to selectively turn the audio on or off; a user can use a slider (133) to adjust the audio volume; etc. In general, the video player (121) can present more or less control elements for the control of the playback of the video.

In FIG. 2, the video player is capable to display a web page within the video screen allocated for the video player. The video player presents a banner at the end of the video. The banner optionally includes an icon (123) and a link (125) which can be selected by a user to initiate a call to the advertiser. The banner further optionally includes a telephone number (139) of a connection server, which temporarily associates the telephone number with the advertiser. The banner further optionally includes a link (127) which when selected by the user can cause the web browser to load a web page of the advertiser. In one embodiment, the link (127) points directly to an address of the web page of the advertiser. In another embodiment, the link (127) points to an address of the server, which when visited by the web browser provides a message to redirect the request to the web site of the advertiser.

In one embodiment, the connection server, the advertisement agency and/or the web server charges the advertiser an advertisement fee when a distinct customer selects the link (127). In one embodiment, the connection server, the advertisement agency and/or the web server charges the advertiser an advertisement fee when a user selects the icon (123) or the link (125) to request a telephone connect with the advertiser. In one embodiment, the connection server, the advertisement agency and/or the web server charges the advertiser an advertisement fee when a customer calls the phone number (139) for a connection to the advertiser. The system or the advertiser may specify the advertisement fee(s) (e.g., in terms of a bid price for a lead to a call, a web visit, etc.).

In one embodiment, the web browser and/or the video player presents the advertiser's phone number when presenting the video with the yellow page listing of the advertiser. When a video player presents the video in other context (e.g., in a blog), the web server replaces the advertiser's phone number with the telephone number of the connection server. When a customer calls the telephone number of the connection server, the connection server connects the call to the advertiser's phone number. In another embodiment, no banner advertisement is displayed when the video player presents the video in the web page showing the listing of the advertiser.

In FIG. 2, the video player includes an icon button (129) which can be selected by a user to request a code for the distribution of the video. In one embodiment, when the user selects the icon button (129), the video player or the web browser displays an embedded web page within the video player, as illustrated in FIG. 3. In FIG. 3, the video player (121) optionally provides a universal resource locator (URL) in a box (143) which can be copied by a user to generate a link to a web page designed to present the video. In one embodiment, the linked web page also presents the listing of the advertiser.

In FIG. 3, the video player (121) optionally provides a segment of code (145) which can be embedded into a HyperText Markup Language (HTML) document to embed the video clip. When the user embeds the code in the HTML document, the web browser embeds the video player into the web page when rendering the HTML document.

In FIG. 3, the user can select the button (147) to dismiss the web page showing inside the video screen of the video player and return to the video presentation.

Although FIG. 3 shows an example where the embedded web page covers the entire video screen of the video player, the embedded web page may use only a portion of the video screen of the video player in some embodiments. In other embodiments, the video player may present the web page in a separate window (e.g., a popup window).

In some embodiment, when the user requests the code, the user can also optionally submit an identity of the user. The advertisement agency and/or the connection provider may associate the identity of the user with the code to reward the user when the video is distributed to other users via the provided code.

Figure 4:
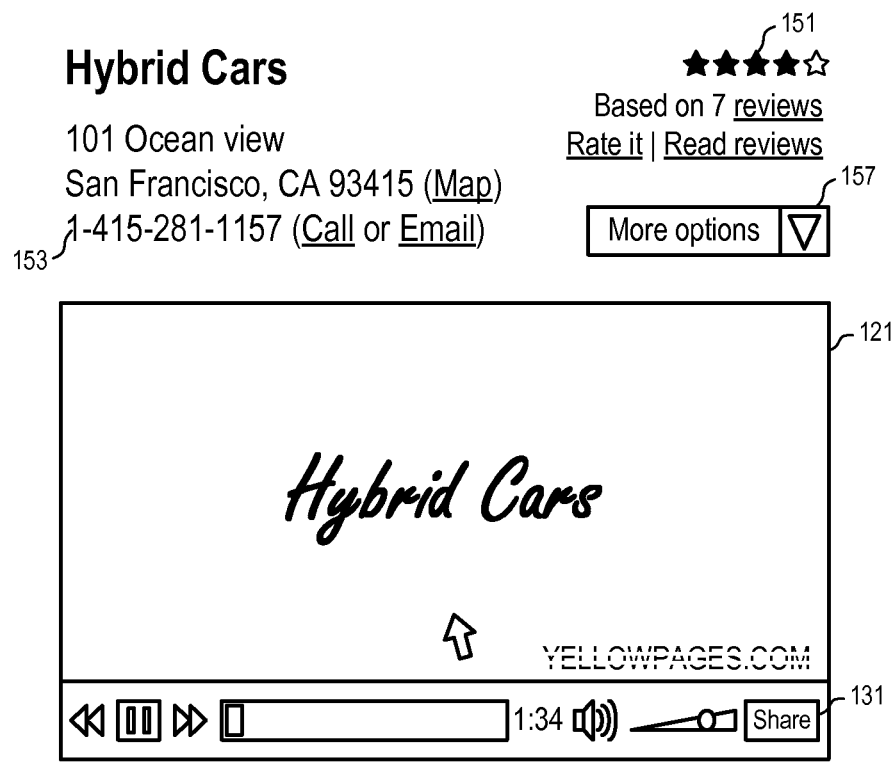
FIG. 4 shows a listing containing a video player to present a video advertisement according to one embodiment.

FIG. 4 shows a listing containing a video player to present a video advertisement according to one embodiment. For example, a web page can present an Internet yellow page listing of a business with a video presentation of the corresponding business. For example, the yellow page listing may include the telephone number (153) of the business. The web page provides the "Call" link to allow a customer to request a call back to the customer for a phone connection to the advertiser. When a telephonic device (e.g., a mobile phone or a computer having a phone implemented partially via software, etc.) presents the listing, the customer can use the "Call" link to initiate a call from the telephonic device.

In FIG. 4, a user can use the "Email" link to send the listing and/or the phone number via email to an address specified by the user. The user can select the menu (157) for more options, such as an option to send the phone number via SMS, an option to save the listing as a note, an option to bookmark the listing, etc.

In FIG. 4, the yellow page listing also includes customer ratings for the business based on feedback from prior customers of the business. For example, a user may read reviews wrote by other users, or to write and/or rate the business.

In FIG. 4, the web page presents the video shown by the player (121) as part of the listing. If a user wants to share the video through other media channel, the user can select the button (131) to request a code (145) as illustrated in FIG. 3. For example, a user can obtain the code from the video player and embed the code into a blog as illustrated in FIG. 5.

Figure 5:
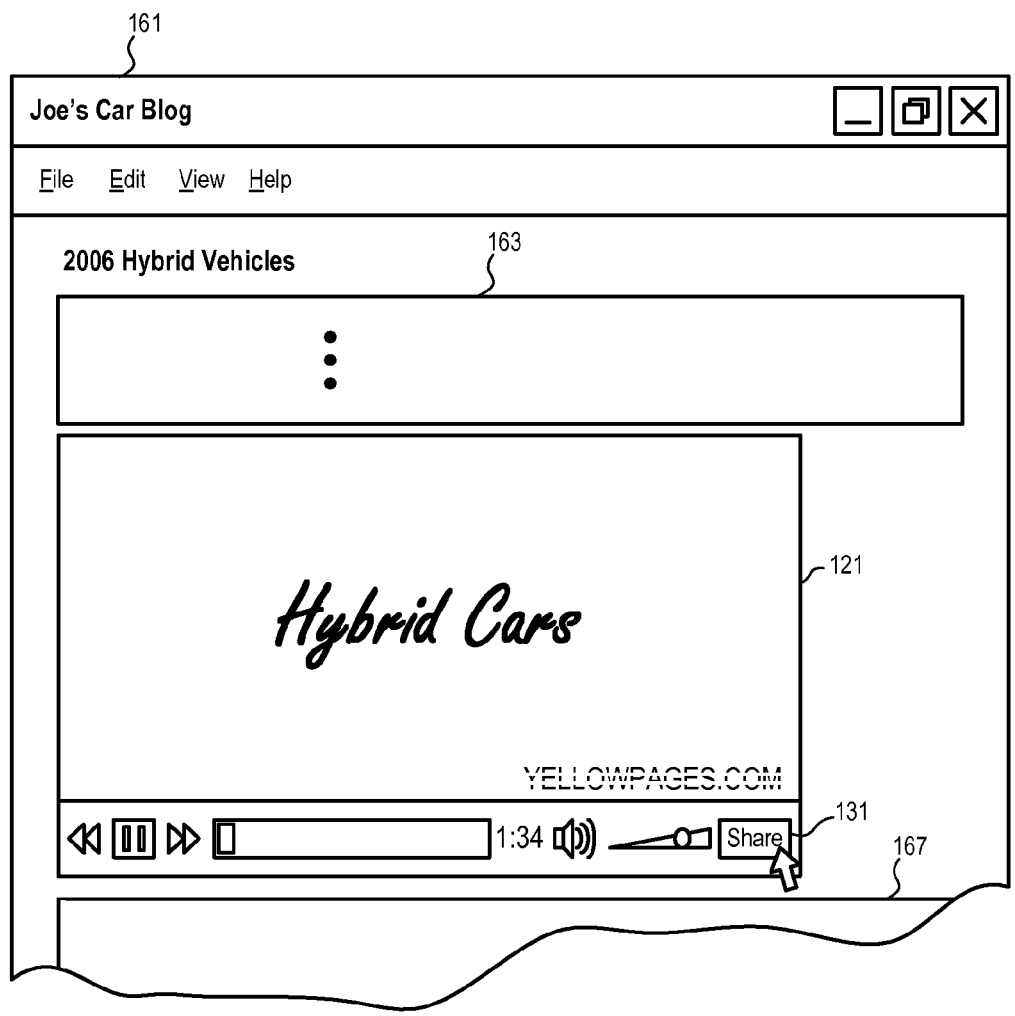
FIG. 5 shows an example of a web page having a video player embedded according to one embodiment.

FIG. 5 shows an example of a web page having a video player embedded according to one embodiment. In FIG. 5, when a web browser (161) loads the blog, the coded embedded in the HTML document of the blog cases the web browser (161) to load the video player (121) in the web page (e.g., between sections 163 and 167). Thus, the web browser presents the video in the context of the blog; and the visitor of the blog may select the button (131) to obtain the code to further distribute the video via other media channel.

In one embodiment, the video server, or a server connected to the video server, dynamically generates a portion of the video when the video player plays back the video. For example, the video server, or a server connected to the video server, may generate the first (or the last frame, or other frames) of video to show information about the advertiser. In some embodiments, the video server, or a server connected to the video server, presents other advertisements relevant to the video and/or the content of the blog.

In one embodiment, when the video player stops the video, the video player presents a banner advertisement in the video screen of the video player.

Figure 6:
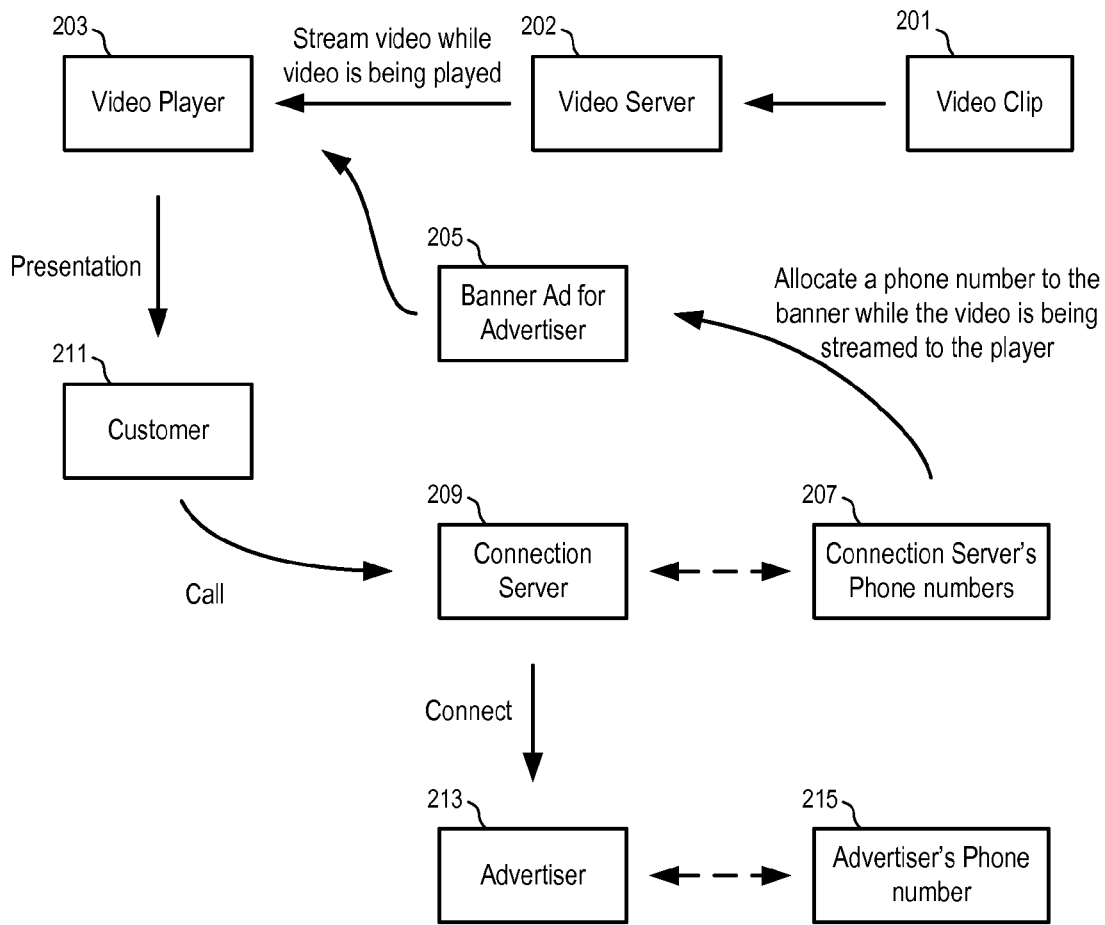
FIG. 6 illustrates a method to distribute an advertisement to connect customers and advertisers for telephonic communications according to one embodiment.

FIG. 6 illustrates a method to distribute an advertisement to connect customers and advertisers for telephonic communications according to one embodiment.

In FIG. 6, a video server (202) streams a video clip (201) to the video player (203) while the video player (203) is playing the video clip (201) to the customer (211). A server (e.g., the video server (202), the connection server (209), or another server not shown in FIG. 6) identifies a banner advertisement (205) and provides it to the video player (203) for presentation when the video player is ready to present the banner. For example, when the user stops the video player (203), or when the video clip (201) comes to an end, the video player (203) presents the banner (e.g., as the last frame of the video, or as a separate banner overlaying on top of the video screen).

In some embodiments, the video player (203) presents the banner before playing the video.

In FIG. 6, the connection server (209) (or the video server (202), or a separate server not shown in FIG. 6) allocates one of the connection server's phone numbers (207) to the banner while the video server (202) is streaming the video clip (201) to the video player (203), in anticipation of the display of the banner. The video player presents the allocated phone number with the banner.

After the video player (203) presents the banner (205), the customer (211) may call the connection server (209) using the phone number allocated by the connection server (209) (or the video server (202), or a separate server not shown in FIG. 6) to the banner. Since the connection server (209) (or the video server (202), or a separate server not shown in FIG. 6) allocates the phone number temporarily to the banner advertisement (205), the connection server (209) connects the customer call to the advertiser (213) using the advertiser's phone number (215).

Although FIG. 6 illustrates an example to connect a customer to an advertiser (213) for a telephone conversation using one of the connection server's phone numbers, the video player and/or the connection server can provide other types of communication channels in a similar way. For example, the connection server can connect the customer to the advertiser for instant messaging, chat in text, voice and/or video. For example, the connection server can connect the customer to the advertiser for application sharing, screen sharing, common white-boarding, etc.

Alternatively, the video player can present the banner advertisement (205) to facilitate non-real time communications between customers and advertisers, such as email, web page, etc.

Figure 7:
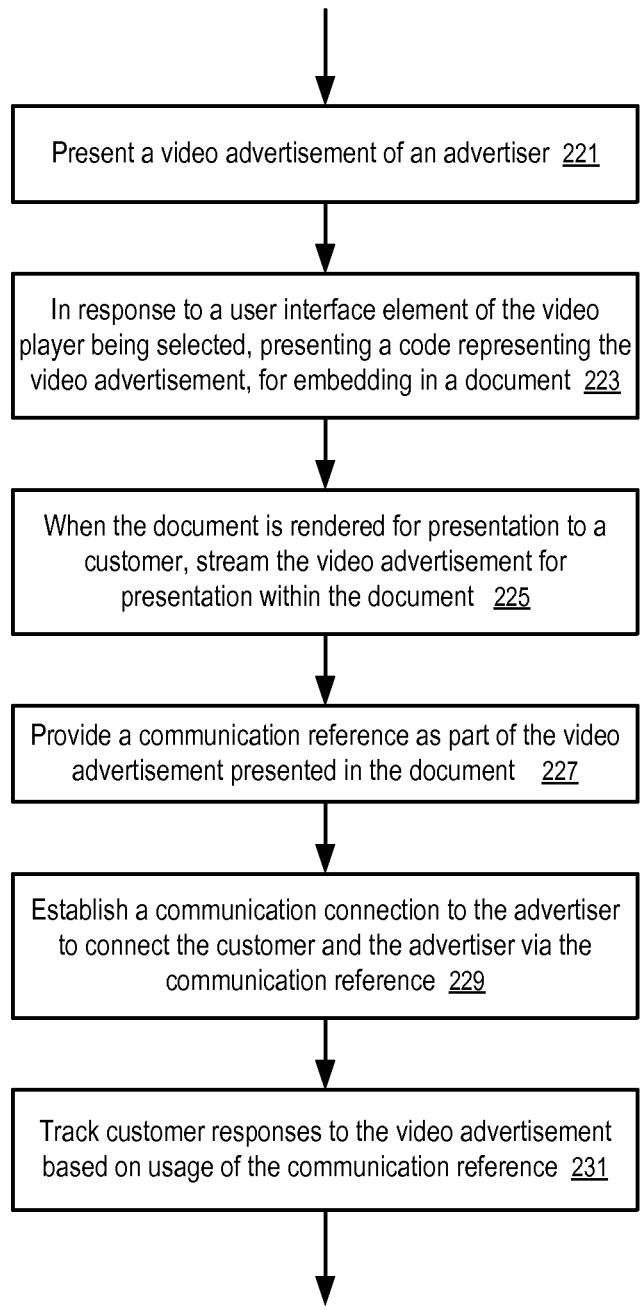
FIG. 7 illustrates a method to track responses to advertisements according to one embodiment.

FIG. 7 illustrates a method to track responses to advertisements according to one embodiment. In FIG. 7, a video player (203) presents a video advertisement (201) of an advertiser (213). In response to a user selecting a user interface element (129) of the video player, the video player (203) presents (223) a code representing the video advertisement, for embedding in a document (e.g., a blog or email, as illustrated in FIG. 4). When a browser renders the document in which the code is embedded by the user for presentation to a customer, a video server (202) streams (225) the video advertisement to the video player (203) for presentation within the document (e.g., a blog or email, as illustrated in FIG. 4).

In one embodiment, the video player (203) provides (227) a communication reference as part of the video advertisement presented in the document. A user can use the communication reference to request a connection server (209) to establish (229) a communication connection to the advertiser to connect the customer and the advertiser and to track (231) customer responses to the video advertisement (e.g., based on the usage of the communication reference).

In one embodiment, the user interface selectable to request the code is integrated with a player of the video advertisement.

In one embodiment, the method further includes charging the advertiser per connection established to the advertiser via the communication reference.

In one embodiment, the communication connection established between the customer and the advertiser comprises a connection for telephonic conversation; and the communication reference comprises a telephone number without an extension, a telephone number with an extension, a Voice over Internet Protocol (VoIP) user identifier, a session initiation protocol (SIP) uniform resource identifier (URI), or a user identifier of an instant messaging network.

In one embodiment, the method further includes allocating the communication reference to the advertiser in response to the document being rendered for presentation.

In one embodiment, the establishing the communication connection includes a central controller calling the advertiser to establish a telephonic connection with the advertiser, and bridging the telephonic connection with the advertiser and a telephonic connection between the central controller and the customer.

In another embodiment, the communication reference is presented as a hyper-link.

In one embodiment, the providing the video advertisement includes a banner advertisement presented in place of the video advertisement after an end of the video advertisement; wherein the banner advertisement includes the communication reference.

In one embodiment, the banner advertisement is presented by a video player of the video advertisement.

In one embodiment, the video advertisement is presented via a video player embedded in a browser of the document; and the method further includes loading a web document in place of the video player at an end of the video advertisement. In one embodiment, the web document includes an advertisement relevant to the video advertisement.

In one embodiment, the method further includes determining the advertisement provided in the web document based at least in part a content of the document in which the code is embedded.

In one embodiment, the method further includes: determining a content of the document in response to the document being rendered for presentation; determining whether the content of the document matches the video advertisement; and in response to a determination that the content of the document does not match the video advertisement, providing an alternative video advertisement for presentation in the document.

In one embodiment, the method further includes: in response to the document being rendered for presentation, determining whether the video advertisement has been previously presented to the customer; and in response to a determination that the video advertisement has been previously presented to the customer, providing an alternative video advertisement for presentation in the document.

In one embodiment, the method further includes selecting the alternative video advertisement based on a content of the document.

In one embodiment, the providing the video advertisement for presentation in the document includes: streaming the video advertisement to the customer while the video is being played to the customer; allocating the communication reference to the advertisement in response to streaming a last frame of the video advertisement; presenting the communication reference to the customer at an end of the video advertisement.

In one embodiment, the communication reference includes a telephone number of a connection server, which when called causes the connection server to further connect to the advertisement based on the allocating of the communication reference to the advertisement; and wherein the code includes a uniform resource locator (URL).

Figure 8:
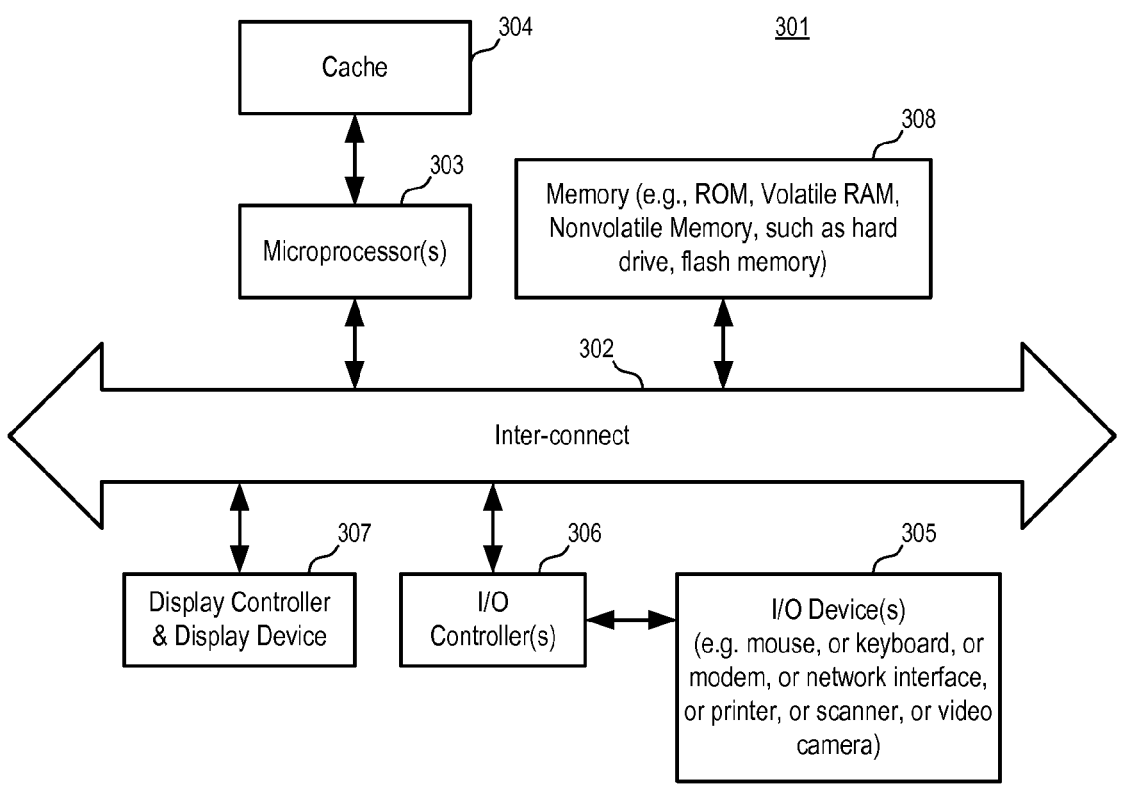
FIG. 8 illustrates a data processing system which can be used in various embodiments.

FIG. 8 illustrates a data processing system which can be used in various embodiments. While FIG. 8 illustrates various components of a computer system, it is not intended to represent any particular architecture or manner of interconnecting the components. Other systems that have fewer or more components may also be used.

In one embodiment, a server data processing system as illustrated in FIG. 8 is used as one of the video server (202), the connection server (209), a database server hosting the video data (101), or a server not shown in the Figures. In some embodiments, one or more servers of the system can be replaced with the service of a peer to peer network of a plurality of data processing systems, or a network of distributed computing system. The peer to peer network, or a distributed computing system, can be collectively viewed as a server data processing system.

A user terminal as a client system can be a data processing system similar to the system of FIG. 8. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone. For example, the data processing system as shown in FIG. 8 may run the video player (203) and present the web pages illustrated in FIG. 4.

In FIG. 8, the communication device (301) is a form of a data processing system. The system (301) includes an inter-connect (302) (e.g., bus and system core logic), which interconnects a microprocessor(s) (303) and memory (308). The microprocessor (303) is coupled to cache memory (304) in the example of FIG. 8.

The inter-connect (302) interconnects the microprocessor (s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   presenting to a customer, via a communication network, a video advertisement of an advertiser, the video advertisement being included in a browser document for presentation to the customer;
   allocating a communication reference to the advertiser:
     responsive to the browser document being rendered for presentation; and
     while the video advertisement is being streamed via the communication network for presenting to the customer;
     wherein the communication reference is for requesting a communication connection to the advertiser;
   including the communication reference in the video advertisement for presentation to the customer while the video advertisement is being streamed via the communication network for presenting to the customer, wherein the communication reference is included in one or more of:
   a frame of streamed video, occurring at an end of the streamed video; and
   an advertisement image frame appended to the end of the streamed video;
   wherein the video advertisement is selected from a plurality of preexisting video advertisements; and
   in response to a request made using the communication reference, establishing a communication connection, via the communication network and a connection provider, between the customer and the advertiser.

2. The method of claim 1, further comprising: charging the advertiser per connection established to the advertiser using the communication reference.

3. The method of claim 2, wherein the communication connection established between the customer and the advertiser comprises a connection for telephonic conversation; and the communication reference comprises one of a telephone number without an extension, a telephone number with an extension, a voice over Internet protocol user identifier, a session initiation protocol uniform resource identifier, and a user identifier of an instant messaging network.

4. The method of claim 3, wherein establishing the communication connection comprises a central controller calling the advertiser to establish a telephonic connection with the advertiser, and bridging the telephonic connection with the advertiser and a telephonic connection between the central controller and the customer.

5. The method of claim 1, wherein the communication reference is presented as a hyper-link.

6. The method of claim 1, wherein providing the video advertisement comprises presenting a banner advertisement after an end of the video advertisement; wherein the banner advertisement includes the communication reference.

7. The method of claim 6, wherein the banner advertisement is presented by a video player of the video advertisement.

8. The method of claim 1, wherein the communication reference comprises a telephone number of a connection server, which when called causes the connection server to further connect the customer to the advertiser.

9. The method of claim 1, wherein the video advertisement comprises a user interface selectable to request a code representing the video advertisement.

10. The method of claim 9, wherein a user interface selectable to request the code is integrated with a player of the video advertisement.

11. The method of claim 9, wherein the video advertisement is presented via a video player embedded in a browser document; and the method further comprises: loading a web-based distribution document in place of the video player at an end of the video advertisement, the code embedded in the web-based distribution document.

12. The method of claim 11, wherein the browser document includes an advertisement related to the video advertisement.

13. The method of claim 12, further comprising:
   determining the advertisement provided in the web-based distribution document based at least in part on a content of the web-based distribution document.

14. The method of claim 13, further comprising:
   determining, via a computing device, a content of the web-based distribution document in response to the web-based distribution document being rendered for presentation;
   determining, via the computing device, whether the content of the web-based distribution document matches the video advertisement; and
   in response to a determination that the content of the web-based distribution document does not match the video advertisement, providing, via the computing device, a code for an alternative video advertisement for presentation in the web-based distribution document.

15. The method of claim 14, further comprising:
   in response to the web-based distribution document being rendered for presentation, determining, via the computing device, whether the video advertisement has been previously presented to the customer; and
   in response to a determination that the video advertisement has been previously presented to the customer, providing, via the computing device, a code for an alternative video advertisement for presentation in the web-based distribution document.

16. The method of claim 15, further comprising:
   selecting, via the computing device, the code for the alternative video advertisement based on a content of the web-based distribution document.

17. The method of claim 16, wherein the web-based distribution document comprises one of a blog and an email.

18. The method of claim 1, further comprising:
analyzing content of the browser document; and
wherein the selecting the video advertisement is at least partially based on the content of the browser document.

19. A non-transitory tangible machine readable medium storing instructions that, when executed by a computing device, cause the computing device to perform a method, the method comprising:
presenting to a customer a video advertisement of an advertiser, the video advertisement being included in a browser document for presentation to the customer;
allocating a communication reference to the advertiser:
responsive to the browser document being rendered for presentation; and
while the video advertisement is being streamed via the communication network for presenting to the customer;
wherein the communication reference is for requesting a communication connection to the advertiser;
including the communication reference in the video advertisement for presentation to the customer while the video advertisement is being streamed via the communication network for presenting to the customer, wherein the communication reference is included in one or more of:
a frame of a streamed video, occurring at the end of the streamed video; and
an advertisement image frame appended to the end of the streamed video;
wherein the video advertisement is selected from a plurality of preexisting video advertisements and a connection provider includes the communication connection to the preselected video advertisement; and
in response to a request made using the communication reference, establishing a communication connection with the advertiser via connection provider.

20. A system, comprising:
a processor configured to:
present a video advertisement of an advertiser, the video advertisement being included in a browser document for presentation to the customer;
allocate a communication reference to the advertiser:
responsive to the browser document being rendered for presentation; and
while the video advertisement is being streamed via the communication network for presenting to the customer;
wherein the communication reference is for requesting a communication connection to the advertiser;
include the communication reference in the video advertisement for presentation to the customer while the video advertisement is being streamed via the communication network for presenting to the customer, wherein the communication reference is included in one or more of:
a frame of a streamed video, occurring at the end of the streamed video; and
an advertisement image frame appended to the end of the streamed video;
wherein the video advertisement is selected from a plurality of preexisting video advertisements; and
a communication network configured to establish, in response to a request made using the communication reference, a communication connection between the customer and the advertiser.

* * * * *